United States Patent
Blumberg et al.

(10) Patent No.: US 6,532,231 B1
(45) Date of Patent: Mar. 11, 2003

(54) ARRANGEMENT FOR CHANGING THE DESTINATION OF SINGLE LINK, SINGLE DESTINATION DATA MESSAGES

(75) Inventors: Marc R. Blumberg, Oak Park, IL (US); Edgardo Soriano Cabrera, Batavia, IL (US); Steven Anthony Jacks, Villa Park, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/231,181

(22) Filed: Jan. 14, 1999

Related U.S. Application Data

(63) Continuation-in-part of application No. 08/703,146, filed on Aug. 29, 1998, now abandoned.

(51) Int. Cl.⁷ .............................................. H04Q 11/04
(52) U.S. Cl. .................... 370/360; 370/217; 370/221; 370/225; 370/237; 714/7; 714/51
(58) Field of Search ................................ 370/216, 217, 370/221, 225, 237, 242, 243, 244, 245, 360, 363, 390, 394; 714/6, 7, 48, 49, 50, 51

(56) References Cited

U.S. PATENT DOCUMENTS

| | | | |
|---|---|---|---|
| 4,653,048 A | * | 3/1987 | Anderson et al. |
| 6,011,780 A | * | 1/2000 | Vaman et al. |
| 6,374,336 B1 | * | 4/2002 | Peters et al. |

* cited by examiner

*Primary Examiner*—Dang Ton
*Assistant Examiner*—Shick Hom
(74) *Attorney, Agent, or Firm*—Werner Ulrich

(57) ABSTRACT

An arrangement and method for switching a single destination data channel to a different destination without losing any data messages. Such a switch is required, for example, when a switch is made to a standby control unit and the messages originally destined for the original active control unit must be sent to the standby. Received messages are drained from the source prior to making the switch. Appropriate data is copied from the active unit to the standby so that the standby unit is in a state to start accepting newly queued messages from the source.

4 Claims, 2 Drawing Sheets

ARRANGEMENT FOR CHANGING THE DESTINATION OF SINGLE LINK, SINGLE DESTINATION DATA MESSAGES

RELATED APPLICATION

This Application is a Continuation-in-Part of application Ser. No. 08/703,146, filed by the Inventors of this Application on Aug. 29, 1998, now abandoned.

TECHNICAL FIELD

This invention relates to a method and apparatus for changing, with a minimum of disruption, the destination of data messages being transmitted over a single destination data link.

Problem

Data messages are used to communicate among the blocks of telecommunication systems. Individual units are frequently removed from service because of trouble or to perform maintenance. If a messaging system, such as the standard LAPD, (Link Access Protocol-D Channel), Messaging System has only a single destination, then the process of switching from one unit to another creates problems because of lost message segments which are in transit to a unit about to be disabled or which form part of an incomplete message sent to a unit being placed in service. A problem of the prior art is that there is no satisfactory arrangement for switching between units without the loss of some of these inter-unit messages if there is a limitation that inter-unit messages have only a single destination.

Solution

The above problem is solved and an advance is made over the teaching of the prior art in accordance with this invention wherein when a switch from a controlling unit currently transmitting to a first controlled unit is to be made, such that the controlling unit will subsequently transmit messages to a second controlled unit, the controlling unit stops sending new messages to the first controlled unit and queues additional messages received from clients in its own memory; the controlling unit then sends drain messages to the first controlled unit as a signal that a switch is about the take place; when the controlled unit has acknowledged all of the drain messages sent by the controlling unit, the controlling unit sends a switch command to the first controlled unit; the first controlled unit disconnects from the data link and appropriate data is copied from the first controlled unit to the second controlled unit; the second controlled unit then connects to the data link and the controlling unit sends accumulated and new messages to the second controlled unit which now is the active controlled unit. Advantageously, this arrangement allows for a switch between the first and second controlled unit without the loss of any message segments and with proper acknowledgement of all message segments sent by clients.

In accordance with one aspect of Applicants' invention, all dynamic memory is copied from the first controlled unit to the second controlled unit before the second controlled unit connects to the data link. Advantageously, this permits all state information and accumulated messages information to be transferred to the controlled unit, so that the controlled unit can process all subsequent message segments.

DETAILED DESCRIPTION

Figure 1:
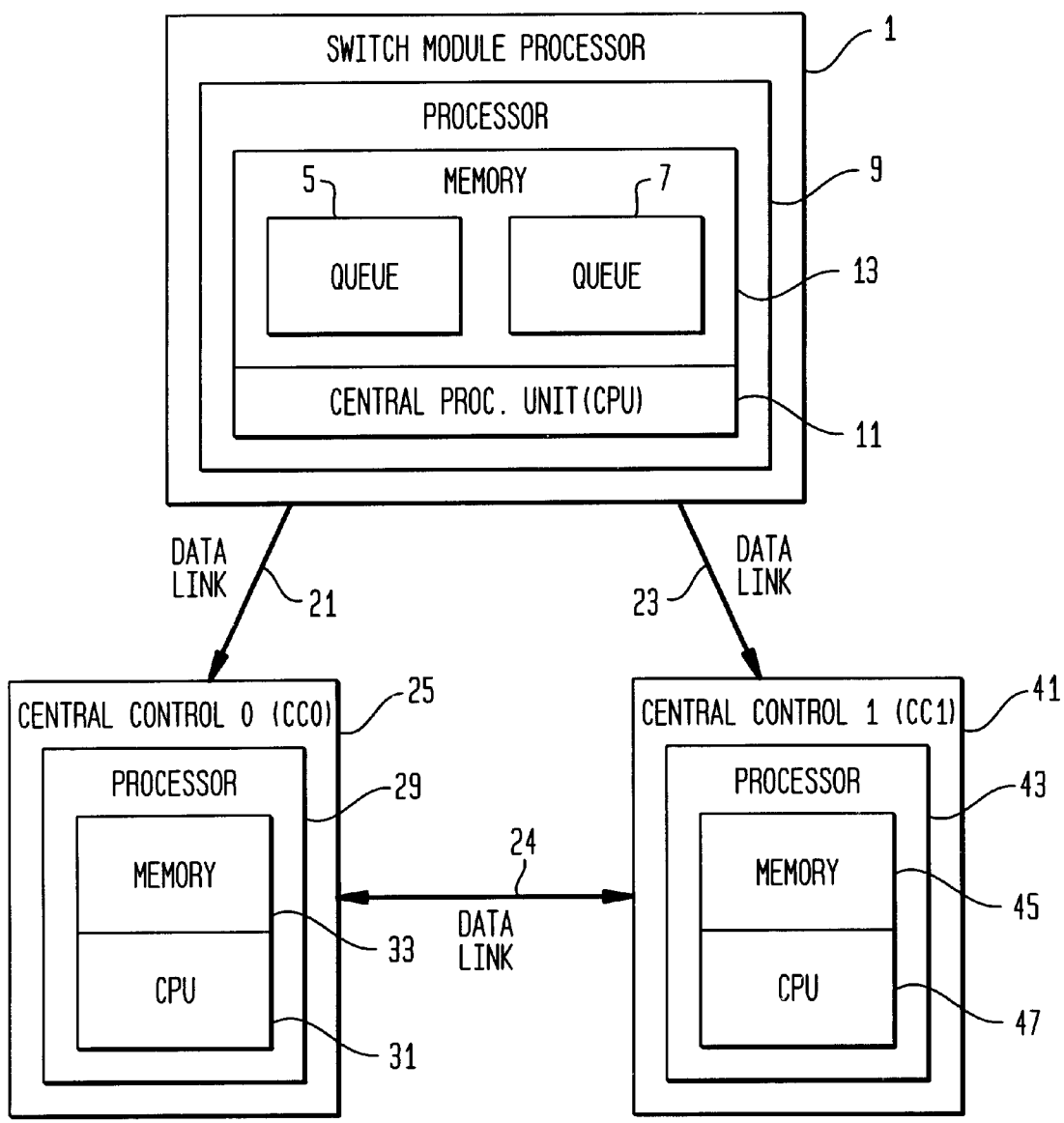
FIG. 1 is a block diagram illustrating Applicants' invention.

FIG. 1 is a block diagram illustrating the principles of applicants' invention. A controlling processor, a switch module processor, (SMP) 1 transmits data messages to one of two units, common control zero (Block 25), and common control one (Block 41), over LAPD links 21 and 23, respectively. In some applications, pertinent to Applicants' invention, the layer 2 protocol of acknowledged LAPD is such that only a single unit exists at each end of the physical link. SMP 1 includes a program controlled processor 9, comprising a central processing unit, (CPU) 11, and memory 13 for storing a control program. SMP 1 further includes two queues for transmitting messages: queue 5 is used for transmitting messages that use LAPD information transfer that is acknowledged at layer 2, queue 7 is used for transmitting messages that use LAPD information transfer that is unacknowledged at layer 2. The latter messages are sent without layer 2 acknowledgement since they cannot use the acknowledged LAPD information transfer because of the violation of the single destination requirement. However, this link is useful for exchanging information between a standby common control and the SMP.

The layer 2 message frames processed by the LAPD protocol have a maximum length layer 3 information field, (256 bytes in the preferred embodiment). Such a message frame may be part of a longer message, recognized at layer 3; however, for the purposes of the LAPD protocol, each layer 2 message frame, referred to herein as a message, is self-contained.

Queue 5 in Applicants' preferred embodiment actually comprises a plurality of queues or subqueues, each queue having different priority and different specialized requirements. LAPD protocol allows a physical link to be divided into several logical links, with each logical link having its own queue. Each messaging application is assigned a LAPD logical link. For example, high priority commands use high priority logical links and their corresponding queues. For example, one of the queues is used for transmitting messages which are unacknowledged at layer 2; this is allowed in the LAPD protocol.

The two controlled units are common control zero and common control one, each of which comprises a program controlled processor. Common control zero, (CC0) comprises program controlled processor 29, which includes CPU 31, and memory for programs 33 and common control one, includes program controlled processor 43, that includes CPU 45 and memory 47. Memories 33 and 47 are also used for queuing of message segments to be transmitted to SMP 1.

Figure 2:
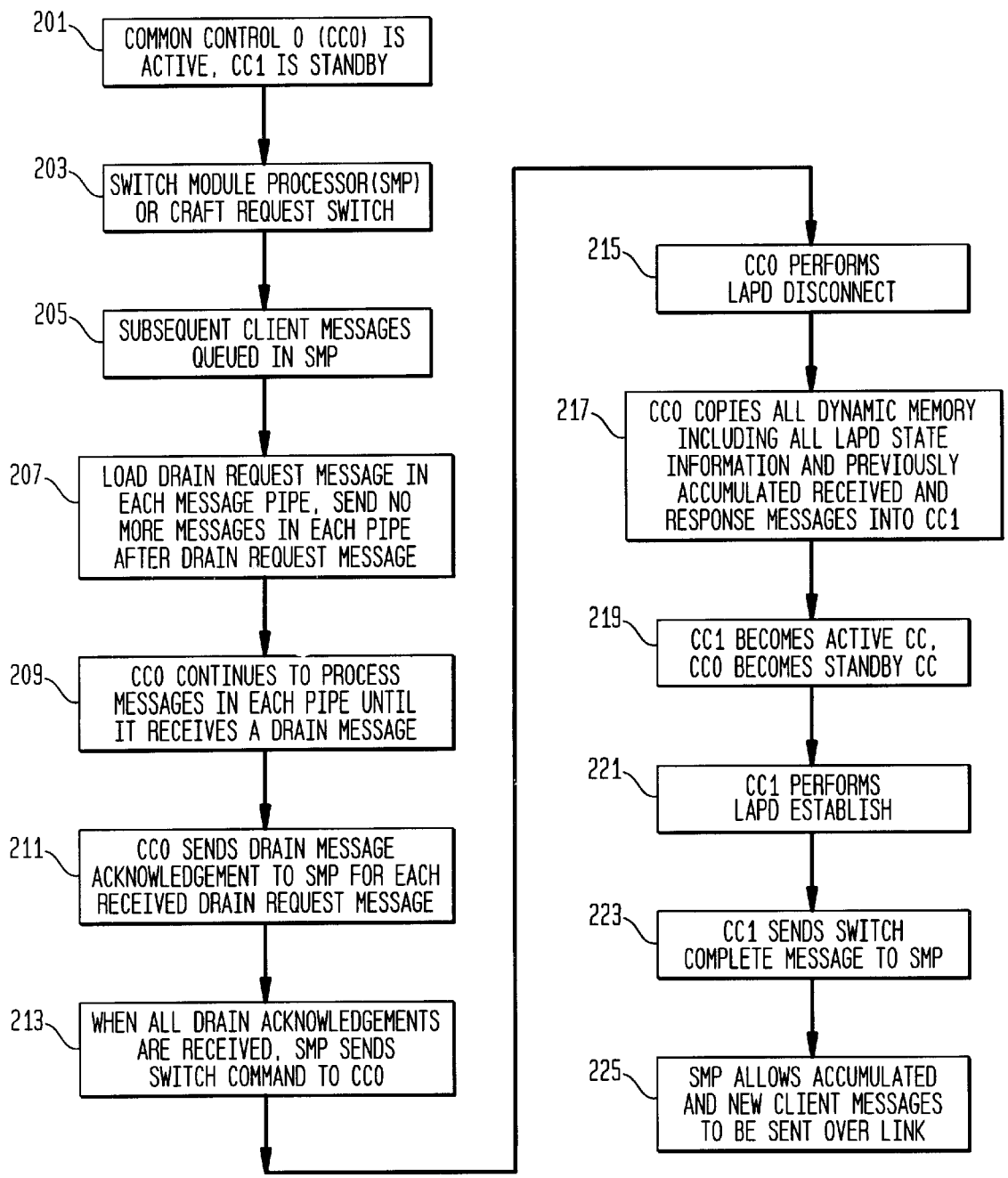
FIG. 2 is a flow diagram illustrating the operation of Applicants' invention.

In the example of this description, a switch is to be made from common control zero, (CC0), which is presently the active common control, to common control one, (CC1), which is presently the standby common control. FIG. 2 is a flow diagram illustrating the steps of the process of making this switch. Block 201 represents the present state in which CC0 is active, and CC1 is standby. The SMP on its own, or in response to a craft request, makes a request for a switch to take place, (Action Block 203). For example, once a day, the SMP runs routine exercises including a soft switch such as the one described in FIG. 2. Subsequent client messages received after the switch request are queued in the SMP, (Action Block 205). Action Block 207 loads drain request messages in each of the message pipes, (LAPD logical links and their associated messages queues), of CC0 for subqueues of queue 5, and sends no more messages into any pipe after the drain request messages have been sent. CC0 continues to process messages in each pipe until it receives the first drain message in any pipe; thereafter, no more pending messages will be queued (Action Block 209). CC0 sends drain message acknowledgements to the SMP for each received drain message, after it has emptied each subqueue, (Action Block 211). When all the drain acknowledgements are received by the SMP, the SMP sends a switch command to CC0 over LAPD link 21. Responsive to receiving the switch request, CC0 performs a disconnect action to disconnect itself from LAPD link 21, (Action Block 215). (The link to a standby common control need not be disconnected since it uses unacknowledged layer 2 information transfer.) Thereafter, CC0 copies all dynamic memory including all LAPD state information and all previously accumulated received and response messages into CC1, (Action Block 217). This copying is accomplished using a data transmission arrangement such as the data link 24, (FIG. 1), interconnecting CC0 and CC1. Message buffers are copied, but they are empty because the drain has taken place. Since the logical links have been drained, there should be no LAPD messages pending in the queues which need to be copied. Unprocessed messages are queued in the layer 3, (and up), queues, and must be copied into CC1. (The disconnect does not prevent CC0 from receiving unacknowledged messages transmitted from queue 7 of SMP 1 to a standby common control). At this point, CC1 becomes the active common control and CC0 becomes the standby common control, (Action Block 219). CC1 then performs a LAPD logical link establishment action to connect itself to LAPD link 23, (Action Block 221). CC1 sends a switch complete message to SMP1, (Action Block 223), and SMP 1 now allows all accumulated and new client messages to be sent over data link 23, (Action Block 225). At this point, CC1 is fully active and capable of communicating with SMP1 without the loss of any data or any results of processing of data that has previously taken place in CC0.

Many similar arrangements can be designed by those of ordinary skill in the art without departing from the scope of this invention. The invention is only limited by the Claims.

What is claimed is:

1. In a system comprising a controlling unit and at least two controlled units, said controlling and controlled units being interconnected by data links operating under a single destination protocol, a method of switching transmission of data messages from a first of said controlled units to a second of said controlled units comprising the steps of:

responsive to detection of a request to switch transmission of messages from said first of said controlled units to said second of said controlled uints, queuing subsequently received client messages in a queue in said controlling unit;

transmitting drain request messages to said first controlled unit;

responsive to receipt of drain message acknowledgments, transmitting a switch command to said first controlled unit;

said controlling unit responsive to said switch command, disconnecting itself from one of said data links;

responsive to receipt of said switch command, copying dynamic data from said first controlled unit to said second controlled unit;

said second controlled unit connecting itself to another one of said data links;

said second controlled unit transmitting a switch complete message to said controlling unit; and said controlling unit transmitting accumulated and new client messages to said second controlled unit over said another one of said data links.

2. The method of claim 1 wherein said drain request messages are inserted in said queue immediately following queued messages of said queue, whereby said drain request messages are sent after previously queued messages.

3. The method of claim 2, wherein said queue comprises a plurality of subqueues and whereon one of said drain request messages is inserted in each subqueue.

4. The method of claim 3, wherein the step of transmitting said switch command to said first controlled unit comprises the step of transmitting said switch command responsive to receiving said drain message acknowledgment for each of said plurality of subqueues.

* * * * *